G. E. CLARKE.
RESILIENT VEHICLE WHEEL.
APPLICATION FILED SEPT. 3, 1918.

1,290,023.

Patented Dec. 31, 1918.

Inventor
Geo. E. Clarke
By Egerton R. Case
Attorney

UNITED STATES PATENT OFFICE.

GEORGE EDGAR CLARKE, OF TORONTO, ONTARIO, CANADA.

RESILIENT VEHICLE-WHEEL.

1,290,023.

Specification of Letters Patent.

Patented Dec. 31, 1918.

Application filed September 3, 1918. Serial No. 252,326.

*To all whom it may concern:*

Be it known that I, GEORGE EDGAR CLARKE, of the city of Toronto, county of York, Province of Ontario, Canada, a subject of the King of Great Britain, have invented certain new and useful Improvements in Resilient Vehicle-Wheels, of which the following is a specification.

My invention relates to improvements in resilient vehicle wheels, and the objects of my invention are: first, to provide a practicable wheel of this type, the majority of the springs of which are brought into action simultaneously to absorb shocks originating from any source whatsoever, and second, to design a particular type of bolt having an elastic head integrally formed therewith.

The construction of my invention and its operation will be hereinafter particularly set forth, and what I claim as new will be pointed out in the claims forming part of this specification.

Figure 1:
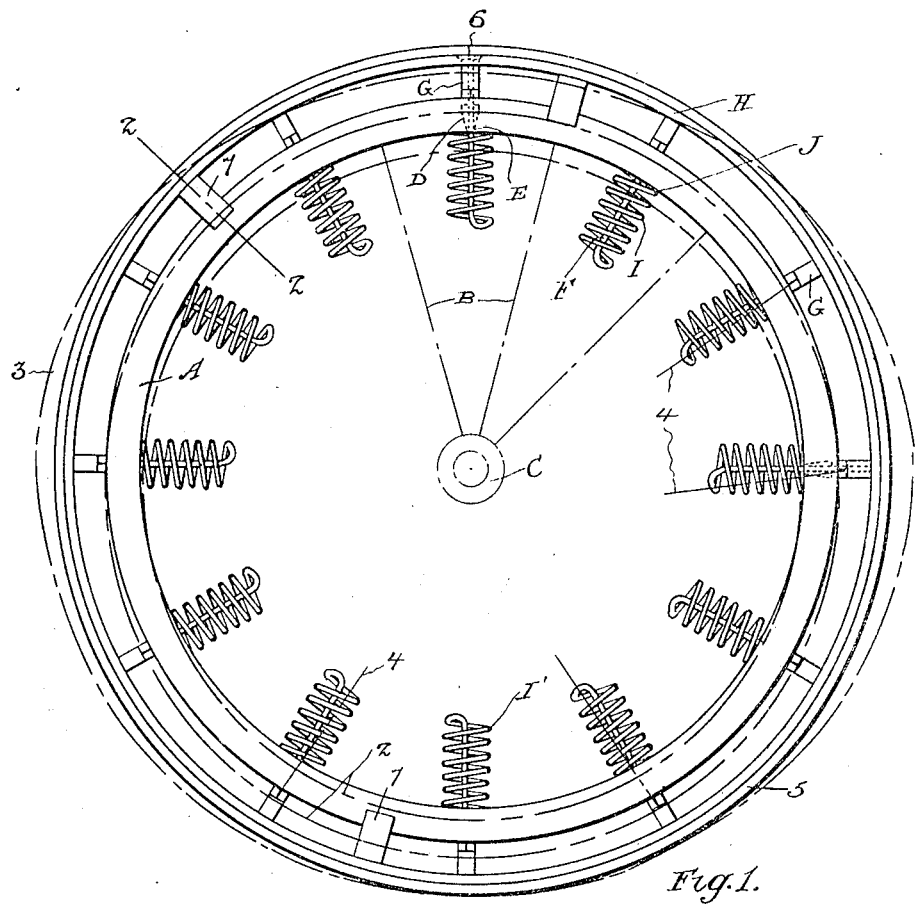
Figure 2:
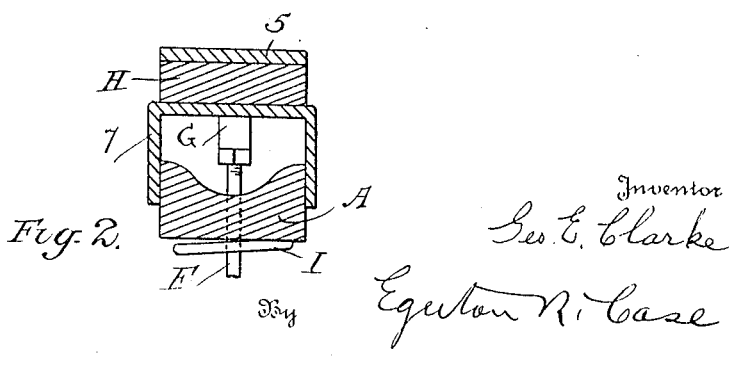

Figure 1 is a side elevation of a wheel within my invention, the spokes and hub being shown partly by dotted lines, and Fig. 2 is a cross section on the line 2—2, Fig. 1.

In the drawings, like characters of reference refer to the same parts.

My wheel comprises a felly A provided with any suitable spokes B connected with any suitable type of hub C. Formed in the felly A are a plurality of flaring slots D, the narrower ends E of which open from the inner side of the felly A. These slots are wider circumferentially of the felly than their width transversely thereof so as to allow for the play therein of the bolts F which pass therethrough. These bolts have slight clearance with two of the sides of each slot and the outer ends thereof, which are threaded, project well beyond the felly and are received by threaded nipples G which are suitably mounted in the outer rim H. Integrally formed with each bolt F is an elastic head in the form of a coiled-spring I through which each bolt centrally passes. The outer ends J of these springs rest at all times against the inner side of the felly A.

The felly A is stiff, whereas the rim H is more or less flexible. The broken lines 2 represent approximately the position of the felly A as displaced by the weight of the car. The broken line 3 represents approximately the position of the rim H under the load mentioned. As a result of the movement given the felly, the elastic heads I, will become active in absorbing shocks.

The bolts F occupying temporarily a vertical position will not be moved circumferentially of the felly A, whereas the bolts F occupying intermediate positions will be moved. Such angular movement is approximately indicated by the lines 4. The shape of the elastic heads I, will freely allow for this angular movement.

The outer rim H is suitably provided with any suitable type of tread 5. This tread 5 will be preferably employed so as to form a protection for the outer ends or heads 6 of the nipples G.

In order to assist the nipples G and bolts F to maintain the said felly A and rim H in coöperative relationship, I suitably secure to the rim H, guide plates 7 which straddle the felly A, and have easy contact therewith.

The elastic heads or springs I are positioned between the spokes, and since they are essentially located within the felly A, they will be well above the roadway.

It will be understood that the bolt F provided with the type of elastic head indicated, can be used for purposes other than that indicated.

While I have described what I consider to be the best embodiments of my invention, I desire it to be understood that the principle may be embodied in many different forms.

Claims:

1. A resilient vehicle wheel comprising a felly provided with a plurality of slots radially formed therein, a bolt operating through each of the said slots and provided with an elastic head integrally formed therewith, each head resting against the inner periphery of said felly, the outer ends of said bolts being threaded; an outer rim spaced from said felly, and means whereby said bolts are coupled to said outer rim.

2. A resilient vehicle tire comprising a felly provided with a plurality of flaring slots radially formed therein, the narrower ends of said slots opening from the inner periphery of said felly; a bolt operating through each of the said slots and integrally formed with a coiled-spring which surrounds the same, the outer end of each spring resting against the inner periphery of said felly, the outer ends of said bolts being threaded; an outer flexible rim spaced from said felly, and means whereby said bolts are coupled to said outer rim.

3. A resilient vehicle tire comprising a felly provided with a plurality of flaring slots radially formed therein, the narrower ends of said slots opening from the inner periphery of said felly; a bolt operating through each of the said slots and integrally formed with a coiled spring which surrounds the same, the outer end of each spring resting against the inner periphery of said felly, the outer ends of said bolts being threaded; an outer flexible rim spaced from said felly; means whereby said bolts are coupled to said outer rim, and a plurality of guide plates carried by said outer rim and straddling said felly, for the purpose specified.

4. A coupling element comprising a bolt having an outer threaded end, extending substantially centrally longitudinally through a coiled spring integrally formed therewith which forms an elastic head; the said threaded end projecting beyond one end of said spring.

GEORGE EDGAR CLARKE.

Copies of this patent may be obtained for five cents each, by addressing the "Commissioner of Patents, Washington, D. C."